United States Patent Office 3,178,392
Patented Apr. 13, 1965

3,178,392
HETEROCYCLIC AND LINEAR SILICONMETHYLENE AND POLYSILOXANE COMPOUNDS CONTAINING SILICONMETHYLENE UNITS AND THEIR PREPARATION
William A. Kriner, Philadelphia, Pa., assignor to Rohm & Haas Company, Philadelphia, Pa., a corporation of Delaware
No Drawing. Filed Apr. 9, 1962, Ser. No. 185,803
10 Claims. (Cl. 260—46.5)

The present invention is concerned with new reactive heterocyclic silicon carbon compounds, especially four- and six-membered ring compounds, herein called disilacyclobutanes and trisilacyclohexanes respectively, and higher molecular weight cyclic and linear siliconmethylene compounds. The invention is also concerned with an improved method for the preparation of these compounds including the new reactive compounds and derivatives therefrom.

The new disilacyclobutane compounds of the present invention are generically represented by the following formula:

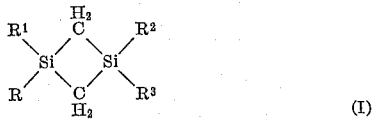

(I)

wherein

R is selected from the group consisting of $(C_1-C_4)$-alkyl and phenyl, $R^1$ is selected from the group consisting of H, halogen, $(C_1-C_4)$-alkyl, phenyl, $(C_1-C_8)$-alkoxy, $(R)_3SiO—$, and $(R)_3SiCH_2—$, $R^2$ is selected from the group consisting of H, halogen, $(C_1-C_4)$-alkyl, phenyl, $(C_1-C_8)$-alkoxy, $(R)_3SiO—$, and $(R)_3SiCH_2—$, $R^3$ is selected from the group consisting of H, halogen, $(C_1-C_4)$-alkyl, phenyl, $(C_1-C_8)$-alkoxy, $(R)_3SiO—$, and $(R)_3SiCH_2—$, with the proviso that (1) at least one of $R^1$, $R^2$, and $R^3$ is selected from the group consisting of H, halogen, $(C_1-C_8)$-alkoxy, $(R)_3SiO$, and $(R)_3SiCH_2—$ groups and phenyl and (2) at least one of $R^2$ and $R^3$ is selected from the group consisting of $(C_1-C_4)$-alkyl groups and phenyl.

The new trisilacyclohexane compounds of the present invention are generically represented by the following formula:

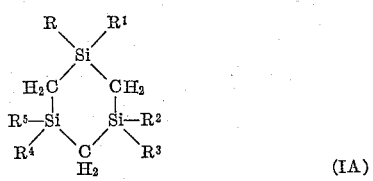

(IA)

wherein

R is selected from the group consisting of $(C_1-C_4)$-alkyl and phenyl, $R^1$ is selected from the group consisting of H, halogen, $(C_1-C_4)$-alkyl, phenyl, $(C_1-C_8)$-alkoxy, $(R)_3SiO—$, and $(R)_3SiCH_2—$, $R^2$ is selected from the group consisting of H, halogen, $(C_1-C_4)$-alkyl, phenyl, $(C_1-C_8)$-alkoxy, $(R)_3SiO$, and $(R)_3SiCH_2—$, $R^3$ is selected from the group consisting of H, halogen, $(C_1-C_4)$-alkyl, phenyl, $(C_1-C_8)$-alkoxy, $(R)_3SiO—$, and $(R)_3SiCH_2—$, $R^4$ is selected from the group consisting of H, halogen, $(C_1-C_4)$-alkyl, phenyl, $(C_1-C_8)$-alkoxy, $(R)_3SiO—$, and $(R)_3SiCH_2—$, $R^5$ is selected from the group consisting of H, halogen, $(C_1-C_4)$-alkyl, phenyl, $(C_1-C_8)$-alkoxy, $(R)_3SiO—$, and $(R)_3SiCH_2—$, with the proviso that at least one of $R^1$, $R^2$, $R^3$, $R^4$ and $R^5$ is selected from the group consisting of H, phenyl, halogen, $(C_1-C_8)$-alkoxy, $(R)_3SiO—$, and $(R)_3SiCH_2—$ groups, that at least one of $R^2$ and $R^3$ and one of $R^4$ and $R^5$ is selected from the group consisting of $(C_1-C_4)$-alkyl groups and phenyl and that no more than two of $R^1$, $R^2$, $R^3$, $R^4$ and $R^5$ are halogen.

The present invention also provides a new and improved method for preparing disilacyclobutanes of the following Formula II which embraces the new reactive compounds of the present invention as well as others:

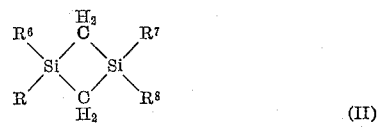

(II)

wherein

R is selected from the group consisting of $(C_1-C_4)$-alkyl groups and phenyl, $R^6$ is selected from the group consisting of $(C_1-C_4)$-alkyl groups, phenyl, $(C_1-C_8)$-alkoxy groups and halogen, $R^7$ is selected from the group consisting of $(C_1-C_4)$-alkyl groups, phenyl, $(C_1-C_8)$-alkoxy groups and halogen, $R^8$ is selected from the group consisting of $(C_1-C_4)$-alkyl groups, phenyl, $(C_1-C_8)$-alkoxy groups and halogen, with the proviso that when one of $R^7$ and $R^8$ is selected from the group consisting of halogen and $(C_1-C_8)$-alkoxy groups, the other must be selected from the group consisting of $(C_1-C_4)$-alkyl groups and phenyl.

The present invention also provides new and improved method for preparing trisilacyclohexanes of the following Formula IIA which embraces the new reactive compounds of the present invention as well as others:

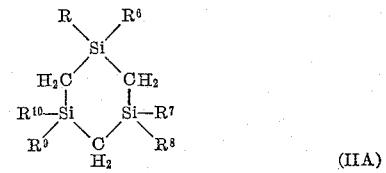

(IIA)

wherein

R is selected from the group consisting of $(C_1-C_4)$-alkyl groups and phenyl, $R^6$ is selected from the group consisting of $(C_1-C_4)$-alkyl groups, phenyl, $(C_1-C_8)$-alkoxy groups, and halogen atoms, $R^7$ is selected from the group consisting of $(C_1-C_4)$-alkyl groups, phenyl $(C_1-C_8)$-alkoxy groups, and halogen atoms, $R^8$ is selected from the group consisting of $(C_1-C_4)$-alkyl groups, phenyl, $(C_1-C_8)$-alkoxy groups, and halogen atoms, $R^9$ is selected from the group consisting of $(C_1-C_4)$-alkyl groups, phenyl $(C_1-C_8)$-alkoxy groups, and halogen atoms, $R^{10}$ is selected from the group consisting of $(C_1-C_4)$-alkyl groups, phenyl $(C_1-C_8)$-alkoxy groups, and halogen atoms, with the proviso that when one of $R^7$ and $R^8$ and one of $R^9$ and $R^{10}$ is a member selected from the group consisting of halogen and alkoxy groups, the other must be a member selected from the group consisting of $(C_1-C_4)$-alkyl groups and phenyl.

The compounds of Formula II and IIA are prepared from starting materials which are monohalomethylsilicon compounds of the formula:

$$XCH_2Si(R°)_3 \qquad (III)$$

wherein

X is a halogen atom, e.g., chlorine, bromine, fluorine, or iodine, preferably chlorine, and R° is selected from the group consisting of halogen, $(C_1-C_4)$-alkyl groups, phenyl and $(C_1-C_8)$-alkoxy groups, at least one of the R° groups being selected from the group consisting of halogen and $(C_1-C_8)$-alkoxy groups.

(a) When one or two of the R° groups is or are methyl and the remaining R° group and X are chlorine, the starting materials of Formula III are prepared by chlorination of trimethylchlorosilane and dimethyldichlorosilane. See United States Patent 2,510,149.

(b) When the R°'s in Formula III are selected from the group consisting of alkyl groups (other than methyl), trialkyl siliconmethylene groups, triphenyl siliconmethylene groups and phenyl groups, the starting materials of Formula III are generally prepared from the reaction of chloromethyltrichlorosilane (prepared according to Ginsburg in J. Gen. Chem., U.S.S.R., 22, 1783 (1952)) with (1) Grignard reagents, such as alkyl Grignards, phenyl Grignards, suitable trialkyl siliconmethylene Grignards, and triphenyl siliconmethylene Grignards, or (2) with alkyl lithium or phenyl lithium compounds.

(c) The starting silanes of Formula III containing alkoxy, trialkylsiloxy or triphenylsiloxy groups may be prepared from halogen-containing starting materials of Formula III mentioned and/or prepared as in paragraphs (a) and (b) immediately preceding by reaction of such materials with the desired alcohol and silanol, with or without tertiary amine bases to accept or capture the liberated halogen acid, or by the use of the alkali metal salts of the alcohol and trialkylsilanol or triphenylsilanol.

A compound or mixture of compounds of Formula III (hereinafter referred to as silanes for brevity) is reacted with magnesium in a suitable solvent such as tetrahydrofuran or alkyl ethers such as methyl ether, ethyl ether or methyl ethyl ether. The reaction is preferably initiated by adding a small amount, such as a drop or two in the case of laboratory batches or a teaspoon or so in a commercial batch, of an alkyl halide such as methyl or ethyl iodide, chloride or bromide to a small amount of magnesium covered by a small amount of the solvent medium, and then adding a small amount of the silane or mixture of silanes. After this initiation, the rest of the silane or mixture of silanes and solvent medium is added to provide a concentration of silane of about 5% to 35% and this is followed by the gradual addition of the magnesium itself. Lower or higher silane concentrations may be used, but lower concentrations slow down the reaction and higher requires more care in control of temperature. It is essential that magnesium be added to the silane of Formula III in small proportions with cooling as necessary to maintain a temperature between 30° to 50° C. By adding the magnesium gradually to the silane so that the silane is present in dominant proportions throughout the major part of the reaction, it is possible to produce a substantial amount of the four-membered and six-membered cyclic compounds of the present invention.

The proportion of magnesium to silane is from about equimolar to 2:1 mol ratio, and is preferably from 5:4 to 7:4 mol ratio. The four- and/or six-membered ring compounds in the reaction product is or are accompanied by by-products of higher molecular weight comprising eight-membered and larger ring compounds and linear polymeric compounds, but by maintaining the temperature in the range specified and controlling the addition of the magnesium it is possible to obtain substantial yields of up to 50% or more of the four-membered ring compounds and up to 33% or more of the six-membered ring compounds. The time required, of course, depends upon the size of the batch being processed and batches of small sizes may be completed in a reaction time of about an hour, whereas batches of substantial commercial size may be completed in five to eight hours or more.

After the completion of the reaction, the batch may be filtered. The filtrate may then be distilled at reduced pressure. Before filtering, there may be added a non-solvent for the magnesium halide or alkoxide to precipitate such salts without precipitating the desired product. Examples of such non-solvents are pentane, hexane and heptane.

When the products of Formulas II and IIA obtained are those in which the groups R, $R^6$, $R^7$, $R^8$, $R^9$, and $R^{10}$ are all alkyl or phenyl, the produce is not hydrolyzed by water and water may be added to extract magnesium salts and sometimes part or all of the solvent, causing the separation of the liquid product as a separate layer. The water may be added before or after filtering and may be followed by decantation. The product layers separated by decantation may be dried by slurrying with a dehydrating agent insoluble in the product, such as magnesium sulfate, then filtered and finally distilled, as mentioned above.

The method so far described produces all of the products of Formulas I and IA except those in which one or two of the groups $R^1$, $R^2$, and $R^3$ in Formula I is or are hydrogen and in which one, two or three of the groups $R^1$, $R^2$, $R^3$, $R^4$, and $R^5$ in Formula IA is or are hydrogen. To prepare these compounds, a compound of Formula II in which one or two of $R^6$, $R^7$, and $R^8$ is or are halogen or alkoxy and a compound of Formula IIA in which one, two, or three of $R^6$, $R^7$, $R^8$, $R^9$, and $R^{10}$ is or are halogen or alkoxy is reacted with lithium aluminum hydride in a solvent such as tetrahydrofuran, ethylene glycol dimethyl ether, or diethylene glycol dimethyl ether at room temperature, or by heating such as to a temperature of 40° C. to 150° C., preferably at reflux. The reaction may take from an hour to eight hours or so. The reaction product may be filtered and distilled or it may be treated carefully with water, and the separated liquid product layer may be dried and then distilled.

One of the essential features of the products of the present invention is the fact that at least one of the groups R, $R^2$, and $R^3$ in Formula I, and at least one of the groups $R^1$, $R^2$, $R^3$, $R^4$, and $R^5$ in Formula IA is hydrogen, a halogen, or an alkoxy group. This type of atom or group provides the reactivity of the compound adapting it to be converted to any one of a great number of valuable derivatives which are useful as lubricants, hydraulic transmission media, water-proofing resins for coating and impregnation of paper, textiles, leather and so on.

The reactive compounds of the present invention may be classified as (A) monofunctional, (B) difunctional, and (C) trifunctional, and they are as follows:

(A) One group of such reactive compounds of the present invention (monofunctional) consists of those in which a single one of the $R^1$, $R^2$, and $R^3$ in Formula I and a single one of the $R^1$, $R^2$, $R^3$, $R^4$, and $R^5$ in Formula IA contain one of the reactive members or groups just mentioned, namely, hydrogen, halogen, or alkoxy. Thus $R^1$ may be one of these groups and $R^2$ and $R^3$ in Formula I and $R^2$, $R^3$, $R^7$, and $R^8$ in Formula IA may then be a relatively inert group and especially alkyl or aryl.

(B) Another group of compounds of the present invention (difunctional) consists of those in which two only of the radicals $R^1$, $R^2$, and $R^3$ in Formula I and two only of the radicals $R^1$, $R^2$, $R^3$, $R^4$, and $R^5$ in Formula IA are formed of reactive atoms or groups, as mentioned hereinabove. This group of compounds may be classified into those wherein the reactive atoms or groups are disposed on the compound in what is known as the cis relationship and another group in which they are disposed in the trans relationship. Formulas IV, V, VI, and VII hereinafter show these two cis and transrelationships in compounds in which the non-reactive substituents are alkyl groups.

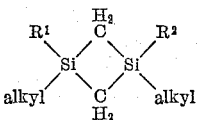

(IV)

Cis relationship of reactive members $R^1$ and $R^2$

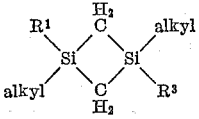

(V)

Trans relationship of reactive members $R^1$ and $R^3$

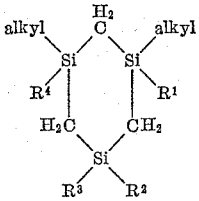

(VI)

Cis relationship of reactive members $R^1$ and $R^4$

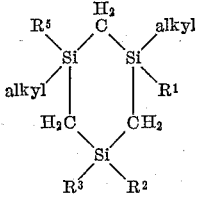

(VII)

Trans relationship of reactive members $R^1$ and $R^5$

In these compounds, the reactive members may be hydrogen, halogen, or alkoxy. Also, the two reactive atoms or groups in a given compound may be the same or they may be different.

(C) Another group of compounds of the present invention (trifunctional) consists of those in which three of the radicals $R^1$, $R^2$, $R^3$, $R^4$, and $R^5$ in Formula IA and three only thereof are formed of reactive atoms or groups as mentioned hereinabove. The reactive groups in this group of compounds may be disposed on the compound in cis and trans relationship. Formulas VIII and IX hereinafter show these two cis and trans relationships:

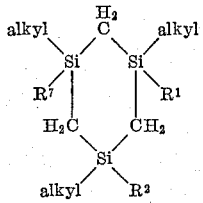

(VIII)

Cis relationship of reactive members $R^1$, $R^2$, and $R^7$

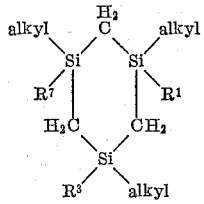

(IX)

Trans relationship of reactive members $R^1$, $R^3$, and $R^7$

In these compounds, the reactive members may be any one of the reactive atoms or groups mentioned heretofore; namely, hydrogen, halogen, and alkoxy. Also, the three reactive atoms or groups in these compounds may be the same or they may be different.

The disilacyclobutane compounds of the present invention which contain one or two reactive atoms or groups described above in one or two of the positions of $R^1$, $R^2$, and $R^3$ of Formula I are hydrolyzable. This results in a transitory conversion of the active atom or group to a hydroxyl. The hydroxyl-containing intermediate condenses with itself or other hydroxyl silicon intermediates. When there is a single reactive atom or group, the condensation in effect produces a dimer of low molecular weight which is still of liquid character and useful as such in lubrication and as hydraulic transmission media. These condensation products may be represented by the following formula (representing the dimer of the hydrolyzed product in which group $R^2$ of Formula I is the hydrolyzable group):

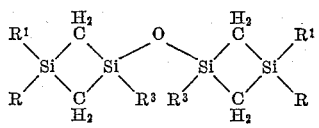

(X)

wherein

R is selected from the group consisting of $(C_1-C_4)$-alkyl groups and phenyl, and $R^1$ and $R^3$ are selected from the group consisting of $(C_1-C_4)$-alkyl, phenyl, $(R)_3SiCH_2-$ and $(R)_3SiO-$.

When the starting material has two reactive groups in any two of the positions of $R^1$, $R^2$, and $R^3$ of Formula I, the condensation product obtained on hydrolysis produces high molecular weight linear polysiloxanes. Typical of them are the compounds obtained when $R^1$ and $R^3$ are the reactive members which, on hydrolysis, produce products which may be represented by the following formula:

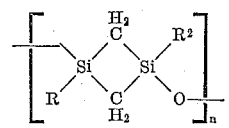

wherein

R is selected from the group consisting of $(C_1-C_4)$-alkyl and phenyl, $R_2$ is selected from the group consisting of $(C_1-C_4)$-alkyl, phenyl, $(R)_3SiCH_2-$, and $(R)_3SiO-$, and $n$ is an integer of 2 or greater.

The condensed hydrolysis products or linear polysiloxanes obtained when the starting disilacyclobutane contains two alkoxy groups or hydrogen atoms (or one each of hydrogen and alkoxy) are of high molecular weight and rubbery in character. They are resistant to oils and have a high resistance to heat depending upon the particular material. They do not decompose on heating until they reach a temperature of 200° C. or higher. However, on exceeding the decomposition temperature just mentioned, the rubber becomes a hard cross-linked material by virtue of breaking of the four-membered heterocyclic ring and the union of one such broken ring with that of another linear condensate. Thus a disilacyclobutane of Formula I in which $R^1$ is hydrogen or alkoxy and $R^2$ is hydrogen or alkoxy hydrolyzes to produce a rubbery condensation product or polysiloxane (cis) of the formula

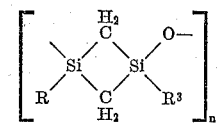

wherein R and $R^3$ are phenyl or $(C_1-C_4)$-alkyl groups. Similarly, a disilacyclobutane of Formula I in which $R^1$ is hydrogen or alkoxy and $R^3$ is hydrogen or alkoxy hydrolyzes to produce a rubbery condensation product or polysiloxane (trans) of the formula

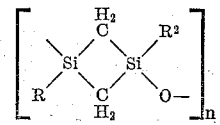

The cis and trans products may be generically represented by the formula

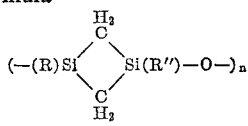

in which R″ may represent either R² or R³ and both R and R″ are selected from the group consisting of phenyl and ($C_1$–$C_4$)-alkyl groups. This linear product on strong heating forms a cross-linked condensation polymer having linear siloxane chains of the structure just defined except that such chains are connected to other such chains through linkages resulting from the opening of disilacyclobutane groups and having the formula

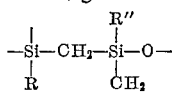

When one or two of the radicals $R^1$, $R^2$, and $R^3$ is a halogen atom, it is hydrolyzable but the hydrolysis in this case should be avoided because of the fact that the hydrogen chloride produced tends to split the four-membered ring. Such silicon halides of Formula I, however, are readily convertible to the corresponding alkoxy-substituted compounds in the manner described hereinafter which in turn can be hydrolyzed as mentioned above.

The conversion of the silicon halides of Formulas I and IA into the corresponding alkoxy-substituted compounds may be effected by reacting the halides with an alkali metal alkoxide such as sodium methylate. This reaction may be effected in an ether or alcohol solvent at temperatures from 10° to 95° C.

The conversion of the silicon alkoxides of Formula I and Formula IA into the corresponding halogen-substituted compounds may be effected by reacting the alkoxy derivative with an alkyl or aryl acid halide or the halides of phosphorus, boron or aluminum. This reaction may be effected with or without an ether solvent at temperatures from 10° to 120° C.

The conversion of the silicon halides of Formula I and Formula IA into the corresponding alkyl-, phenyl-, trialkylsiliconmethylene-, and triphenylsiliconmethylene-substituted compounds may be effected by reacting the halide with the corresponding Grignard reagents or with alkyl-lithium or phenyllithium compounds. This reaction may be effected in an ether solvent at temperatures of 10° to 120° C.

When the disilacyclobutane compounds of the invention comprise one or two alkyl radicals in place of $R^2$ and $R^3$, it has been found that the flexibility or hardness of the linear condensation products or of the cross-linked type thereof may be varied depending upon the size of the alkyl groups. Thus, when this non-reactive group, as well as R, is a methyl group, the condensation products are less flexible whereas when these groups are butyl they are more flexible in the case of rubbers.

The presence of aryl groups in place of alkyl groups as the non-reactive substituents in place of $R^1$, $R^2$, and $R^3$ generally provide products which are of greater stability to oxidation than those obtained from corresponding compounds in which the substituents are of alkyl type. The aryl-substituted products are also less soluble, being more resistant to solvents and to water.

The products of the present invention containing two reactive atoms or groups in place of radicals $R^1$, $R^2$ or $R^3$ in Formula I can be employed for the production of condensation products for coating and impregnation purposes. If desired, the condensation may be effected after impregnation of the material such as paper, textiles, or leather with a compound of Formula I. In addition, the compounds of Formula I in which two of the radicals $R^1$ and $R^2$ or $R^3$ are of reactive character may be used for the formation of hard castings by effecting the condensation to a linear polymeric material and then subjecting the resulting polymeric material to heat while maintaining the material in a suitable mold to produce the highly cross-linked hard solid. Such heating should be at a temperature of about 200° or at such high temperature that the disilacyclobutane ring splits. The temperature of heating may thus be from 200° to 400° C. or higher.

The disilacyclobutane products of the present invention containing two reactive atoms or groups in place of radicals $R^1$, and $R^2$ or $R^3$ in Formula I can be employed in co-condensation reactions with difunctional silanes such as dimethyldiethoxysilane, methylphenyldiethoxysilane, diphenylsilanediol, etc., which are conventionally used to produce linear polysiloxanes and also with silicone oils containing hydroxyl end group functionality. This serves to incorporate into conventional silicones a disilacyclobutane ring which can be utilized to cross-link the resulting linear chains by virtue of breaking of the four-membered heterocyclic ring and the union of one such broken ring with that of another linear condensate. This cross-linking may be brought about by heating above 200° or at such high temperature that the disilacyclobutane ring splits. The temperature of heating may thus be from 200° to 400° C. or higher. This cross-linking is through the —Si—$CH_2$—Si— linkage, e.g. by a linkage of the formula

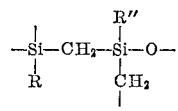

wherein R and R″ are the same or different groups selected from the group consisting of phenyl and ($C_1$–$C_4$)-alkyl groups. The cross-linking may also be effected by strong acids and bases such as hydrogen chloride and sodium hydroxide which will rupture the disilacyclobutane ring resulting in the union of one such broken ring with that of another linear condensate through an —Si—O—Si— linkage. The acid and base may be used in concentrations of 0.15 N or greater and may be used in conjunction with an alcohol solvent. The percentage of the disilacyclobutane ring incorporated in the conventional silicones can be from 0.1 to 50% depending on the amount of cross-linking desired. The cross-linked silicones produced are usually rubbers of varying elasticity and brittleness.

In the examples which follow and are illustrative of the present invention, the parts and percentages are by weight unless otherwise specified.

*Example I*

(a) Methylchloromethylethoxychlorosilane was prepared by the following method:

To a vigorously stirred solution of 655.0 parts of methylchloromethyl dichlorosilane and 316.4 parts of pyridine in 500 ml. of benzene was slowly added 184.2 parts of ethanol over a period of four hours. After an additional 16 hours of stirring, the pyridine hydrochloride was separated by filtration with a benzene wash. The benzene was removed from the filtrate by distillation. Distillation of the product residue gave 435.7 parts (62.9% yield) of methylchloromethylethoxychlorosilane. B.P. 64° C. at 40 mm. Hg pressure, $n_D^{25}$ 1.4256.

*Analysis.*—Calculated for $C_4H_{10}Cl_2OSi$: C, 27.72%; H, 5.82%; Cl, 41.00%; M.W., 173. Found: C, 28.07%; H, 5.83%; Cl, 41.13%; M.W., 175.

(b) 1,3-dimethyl-1,3 - diethoxy - 1,3 - disilacyclobutane was prepared from the above starting material (obtained in part a) by the following method: To a small mixture of magnesium turnings and tetrahydrofuran was added four drops of methyl iodide followed by the addition of a small portion of 667 parts methylchloromethylethoxychlorosilane to start the reaction which was evidenced by a sharp exotherm. The remainder of the silane in sufficient tetrahydrofuran to bring the final silane concentration to 36% was added rapidly with continuous stirring. The remainder of 15.0 parts of magnesium turnings was added slowly to maintain a reaction temperature of 30–50° C. over a period of three hours. Occasional cooling was necessary. After an additional one hour stirring period, the majority of the tetrahydrofuran was removed, by vacuum distillation, and the product was extracted from the residue with hexane. The hexane was distilled off and the residue was fractionated to give 13.9 parts (35.4% yield) 1,3-dimethyl-1,3-diethoxy-1,3-disilacyclobutane having the formula

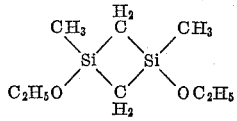

B.P. 78–79° C. at 16 mm. Hg pressure, $n_D^{25}$ 1.4336, $d_{25}$ 0.9124.

*Analysis.*—Calculated for $C_8H_{20}O_2Si_2$: C, 47.00%; H, 9.85%; M.W., 204. Found: C, 46.88%; H, 9.69%; M.W., 202.

In addition, there was obtained 2.1 parts (5.3% yield) 1,3,5-tetramethyl-1,3,5 - triethoxy - 1,3,5 - trisilacyclohexane, B.P. 68–69° C. at 0.20–0.25 mm. pressure, $n_D^{25}$ 1.4478, and 14.6 parts (37.1% yield) of a viscous residue containing higher cyclic and linear methylethoxysilmethylene compounds.

*Example II*

1,1-tetramethyl-3,3-disilacyclobutane was prepared by the following method: To a small mixture of magnesium turnings and tetrahydrofuran was added four drops of methyl iodide followed by the addition of a small portion of 305.9 parts dimethylchloromethylchlorosilane to start the reaction which was evidenced by a sharp exotherm. The remainder of the silane in sufficient tetrahydrofuran to bring the final silane concentration to 33% was added rapidly with continuous stirring. The remainder of 80 parts magnesium turnings was added slowly to maintain a reaction temperature of 30 to 50° C. over a period of two hours. Occasional cooling was necessary. After an additional one and one-half hours stirring with heating to 50° C. the reaction was cooled and 500 parts water added slowly. The organic layer was separated, washed with water and distilled to give:

71.3 parts (49.5% yield) 1,1-tetramethyl-3,3-disilacyclobutane of the formula

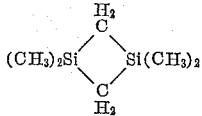

M.P. −9 to −8.5° C. (autogenous pressure), B.P. 60.5 to 61° C. at 100 mm. Hg pressure, $n_D^{25}$ 1.4401, $d_{25}$ 0.7926.

*Analysis.*—Calculated for $C_6H_{16}Si_2$: C, 49.91%; H, 11.17%; M.W., 144. Found: C, 50.03%; H, 11.37%; M.W., 145.

In addition there was obtained (1) 26.7 parts (18.5% yield) 1,1,3,3,5,5-hexamethyl-1,3,5-trisilacyclohexane of the formula

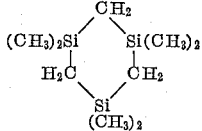

B.P. 112° C. at 50 mm. Hg pressure, $n_D^{25}$ 1.4601.

*Analysis.*—Calculated for $C_9H_{24}Si_3$: C, 49.91%; H, 11.17%; M.W., 218. Found: C, 40.94%; H, 11.00%; M.W., 215.

(2) 2.0 parts (1.4% yield) 1,1,3,3,5,5,7,7-octamethyl-1,3,5,7-tetrasilacyclooctane

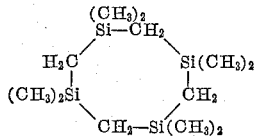

M.P. 79–80.5° C., B.P. 104° C. at 2 mm. Hg pressure.

*Analysis.*—Calculated for $C_{12}H_{32}Si_4$: C, 49.91%; H, 11.17%; M.W., 289. Found: C, 49.86%; H, 11.19%; M.W., 287.

and (3) 18.8 parts (13.1% yield) of viscous residue containing higher cyclic and linear dimethylsilmethylene compounds.

*Example III*

1,3-dimethyl-1,3-dichloro-1,3-disilacyclobutane was prepared by two procedures:

(A) According to Example I, 305.9 parts methylchloromethyldichlorosilane was reacted with 80 parts magnesium to give 22.8 parts (13.2% yield) 1,3-dimethyl-1,3-dichloro-1,3-disilacyclobutane

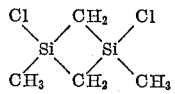

M.P. −7 to −6.5° C. (autogenous pressure), B.P. 59° C. at 20 mm. Hg pressure, $n_D^{25}$ 1.4725.

*Analysis.*—Calculated for $C_4H_{10}Cl_2Si_2$: C, 25.92%; H, 5.45%; Cl, 38.25%; neut. equiv., 185. Found: C, 25.75%; H, 5.44%; Cl, 38.05%; neut. equiv., 193.

In addition, there was obtained 66.3 parts (36.8% yield) of an isotropic mixture of formula $C_6H_{15}Cl_3Si_3$, B.P. 108–109° C. at 5 mm. Hg pressure, $n_D^{25}$ 1.4901.

*Analysis.*—Calculated for $C_6H_{15}Cl_3Si_3$: C, 25.92%; H, 5.45%; Cl, 38.25%; neut. equiv., 278. Found: C, 26.05%; H, 5.36%; Cl, 37.50%; neut. equiv., 281, along with higher molecular weight cyclics and linear compounds.

(B) The alternate procedure consisted of treating 14.48 parts 1,3-dimethyl-1,3-diethoxy-1,3-disilacyclobutane with 20.5 parts benzoyl chloride at 115° C. for 20 hours in the presence of a trace of ferric chloride. 10.1 parts (77% yield) 1,3-dimethyl-1,3-dichloro-1,3-disilacyclobutane was obtained on distillation, B.P. 59° C. at 20 mm. Hg pressure, $n_D^{25}$ 1.4725.

*Example IV*

1,3-dimethyl-1,3-disilacyclobutane was prepared by the following method:

To a stirred slurry of 1.20 parts lithium aluminum hydride in 50 ml. of diethyleneglycoldimethylether was slowly added 10.19 parts 1,3-dimethyl-1,3-dichloro-1,3-disilacyclobutane over a period of 30 minutes. After stirring for an additional 30 minutes, the product was distilled to give 6.11 parts (95.3% yield) 1,3-dimethyl-1,3-disilacyclobutane

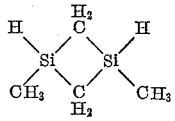

Vapor pressure at 0° C., 14.3 mm. Hg, $n_D^{25}$ 1.4546.

*Analysis.*—Calculated for $C_4H_{12}Si$: C, 41.30%; H, 10.40%; M.W., 116. Found: C, 41.20%; H, 10.34%; M.W., 114.

*Example V*

1,3,5 - trimethyl-1,3,5-triethoxy-1,3,5-trisilacyclohexane was prepared according to the procedure described in Example I. 238.6 parts methylchloromethyldiethoxysilane (prepared by known procedures) was reacted with 45 parts magnesium to give 44.5 parts (33.2% yield) 1,3,5-trimethyl-1,3,5-triethoxy-1,3,5-trisilacyclohexane

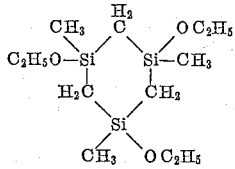

B.P. 97° C. at 1.7 mm. Hg pressure, $n_D^{25}$ 1.4483.

*Analysis.*—Calculated for $C_{12}H_{30}O_3Si_3$: C, 47.00%; H, 9.85%; M.W., 307. Found: C, 47.26%; H, 9.73%; M.W., 304.

Example VI 1,3,5 - trimethyl - 1,3,5 - trichloro - 1,3,5 - trisilacyclohexane was prepared pure by the reaction of 17.6 parts 1,3,5-trimethyl-1,3,5-triethoxy - 1,3,5 - trisilacyclohexane with 23.7 parts phosphorous trichloride at reflux for 9 hours with a rise in temperature of reflux from 75° C. to 108° C. Distillation gave 13.0 parts (81.5% yield) of 1,3,5-trimethyl-1,3,5 - trichloro-1,3,5-trisilacyclohexane

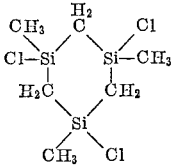

M.P. 58° C., B.P. 93° to 94° C. at 2 mm. Hg pressure.

*Analysis.*—Calculated for $C_6H_{15}Cl_3Si_3$: C, 25.94%; H, 5.45%; Cl, 38.30%; M.W., 278. Found: C, 26.37%; H, 5.47%; Cl, 36.31%; M.W., 277.

Example VII

A preparation of 1,3-dimethyl-1,3-diphenyl-1,3-disilacyclobutane was accomplished by the interaction of 5.93 parts 1,3-dimethyl-1,3-dichloro-1,3-disilacyclobutane, 10.2 parts bromobenzene and 1.7 parts magnesium in 50 ml. of tetrahydrofuran. The magnesium was activated with a few drops of methyl iodide and a few drops of bromobenzene. The disilacyclobutane and tetrahydrofuran were then added at once followed by slow addition of the remaining bromobenzene over a 30-minute period. The reaction was refluxed for an additional 30 minutes after which the contents were hydrolyzed by dumping on ice and the product extracted with ether. 8.0 parts (82.0% yield) of crude 1,3-dimethyl-1,3-diphenyl-1,3-disilacyclobutane remained upon evaporation of the ether. The product of the formula

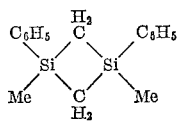

was purified by chromatography, $n_D^{25}$ 1.5740.

*Analysis.*—Calculated for $C_{16}H_{20}Si_2$: C, 71.55%; H, 7.50%. Found: C, 72.14%; H, 7.47%.

Example VIII

The hydrolysis of 8.10 parts 1,3,3-trimethyl-1-ethoxy-1,3-disilacyclobutane with 10 parts water in 10 ml. of ethanol under reflux for 16 hours followed by ether extraction gave upon evaporation of the ether 5.20 parts (81.8% yield) of bis(1,3,3-trimethyl - 1,3 - disilacyclobutyl)-1-siloxane

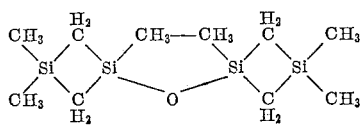

$n_D^{25}$ 1.4525.

*Analysis.*—Calculated for $C_{10}H_{26}OSi_4$: C, 43.75%; H, 9.54%; M.W., 275. Found: C, 43.49%; H, 9.54%; M.W., 272.

Example IX

The hydrolysis of 4.1 parts 1,3-dimethyl-1,3-diethoxy-1,3-disilacyclobutane with 2 parts water under reflux for 6 hours gave 2.8 parts (93% conversion) of a high molecular weight polysiloxane rubber of the formula

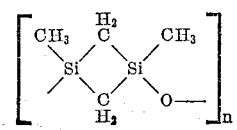

wherein $n$ is a large number. The rubber is very slightly soluble in tetrahydrofuran.

*Analysis.*—Calculated for $[C_4H_{10}Si_2O]_n$: C, 36.93%; H, 7.74%; Si, 43.13%. Found: C, 36.44%; H, 7.77%; Si, 41.55%.

Example X

A thin film of the rubber prepared in Example IX on a silver chloride plate was heated in vacuo to 250° C. for one hour. The infrared spectrum of the resulting film showed almost complete disappearance of the 10.62μ band attributed to the disilacyclobutane ring. The resulting film has the structure

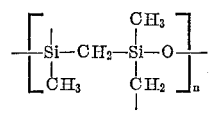

Example XI

The cohydrolysis of 24.7 parts dimethyldiethoxysilane, 1.15 parts 1,3-dimethyl-1,3-diethoxy-1,3-disilacyclobutane and 2.00 parts trimethylethoxy silane in 10 ml. of ethanol with 6.6 parts 0.02 N sodium hydroxide under reflux for 4 hours gave a viscous liquid upon distillation of the ethanol. The viscous liquid was then treated with 15 ml. of 0.036 N hydrochloric acid, refluxed for 4 hours, and distilled until no more volatiles were obtained at 125° C. and 0.25 mm. Hg pressure. The silicone residue, 9.5 parts (65% yield) was a viscous colorless oil containing a minimum of 5 mole percent of disilacyclobutyl groups.

Example XII

The silicone oil described in Example XI was crosslinked to a hard clear rubber by heating for one hour at 300° C.

Example XIII

The silicone oil described in Example XI was crosslinked to a hard opaque rubber by treatment of one part oil with one part concentrated sulfuric acid and then washing with water.

Example XIV

The silicone oil described in Example XI was crosslinked to a brittle opaque rubber by treatment of one part oil with one part concentrated alcoholic potassium hydroxide and washing with water.

I claim:

1. A compound of the formula

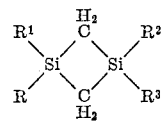

(I)

wherein

R is selected from the group consisting of $(C_1–C_4)$-alkyl and phenyl, $R^1$ is selected from the group consisting of H, halogen $(C_1–C_4)$-alkyl, phenyl, $(C_1–C_8)$-alkoxy, $(R)_3SiO—$, and $(R)_3SiCH_2—$, $R^2$ is selected from the group consisting of H, halogen, $(C_1–C_4)$-alkyl, phenyl, $(C_1–C_8)$-alkoxy, $(R)_3SiO—$, and $(R)_3SiCH_2—$, $R^3$ is selected from the group consisting of H, halogen, $(C_1–C_4)$-alkyl, phenyl, $(C_1–C_8)$-alkoxy, $(R)_3SiO—$, and $(R)_3SiCH_2—$, with the proviso that (1) at least one of $R^1$, $R^2$ and $R^3$ is selected from the group consisting of H, halogen, $(C_1–C_8)$-alkoxy, $(R)_3SiO—$, and $(R)_3SiCH_2—$ groups and phenyl and (2) at least one of $R^2$ and $R^3$ is selected from the group consisting of $(C_1–C_4)$-alkyl groups and phenyl.

2. A compound of the formula

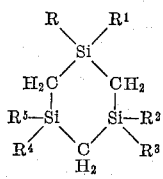

wherein
R is selected from the group consisting of $(C_1-C_4)$-alkyl and phenyl,
$R^1$ is selected from the group consisting of H, halogen, $(C_1-C_4)$-alkyl, phenyl, $(C_1-C_8)$-alkoxy, $(R)_3SiO-$, and $(R)_3SiCH_2-$,
$R^2$ is selected from the group consisting of H, halogen, $(C_1-C_4)$-alkyl, phenyl, $(C_1-C_8)$-alkoxy, $(R)_3SiO-$, and $(R)_3SiCH_2-$,
$R^3$ is selected from the group consisting of H, halogen, $(C_1-C_4)$-alkyl, phenyl, $(C_1-C_8)$-alkoxy, $(R)_3SiO-$, and $(R)_3SiCH_2-$,
$R^4$ is selected from the group consisting of H, halogen, $(C_1-C_4)$-alkyl, phenyl, $(C_1-C_8)$-alkoxy, $(R)_3SiO-$, and $(R)_3SiCH_2-$,
$R^5$ is selected from the group consisting of H, halogen, $(C_1-C_4)$-alkyl, phenyl, $(C_1-C_8)$-alkoxy, $(R)_3SiO-$, and $(R)_3SiCH_2-$,
with the proviso that at least two of $R^1$, $R^2$, $R^3$, $R^4$ and $R^5$ are selected from the group consisting of H, halogen, and $(C_1-C_8)$-alkoxy, groups, that at least one of $R^2$ and $R^3$ and one of $R^4$ and $R^5$ is selected from the group consisting of $(C_1-C_4)$-alkyl groups and phenyl and that no more than two of $R^1$, $R^2$, $R^3$, $R^4$ and $R^5$ are halogen.

3. A disiloxane of the formula

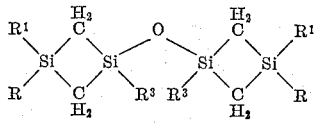

wherein
R is selected from the group consisting of $(C_1-C_4)$-alkyl groups and phenyl, and
$R^1$ and $R^3$ are selected from the group consisting of $(C_1-C_4)$-alkyl, phenyl, $(R)_3SiCH_2-$ and $(R)_3SiO-$.

4. A polymeric linear polysiloxane of rubbery character consisting essentially of a plurality of units of the formula

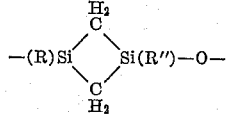

wherein
R is selected from the group consisting of phenyl and $(C_1-C_4)$alkyl groups, and
R'' is selected from the group consisting of phenyl and $(C_1-C_4)$-alkyl groups.

5. A cross-linked condensation product of the polysiloxane of claim 4 having linear siloxane chains as therein defined connected to other such chains through linkages resulting from the opening of disilacyclobutane groups, said linkages having the formula

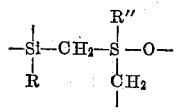

wherein
R and R'' are selected from the group consisting of phenyl and $(C_1-C_4)$-alkyl groups, said condensation product being obtained by heating a polysiloxane of claim 4 at a temperature of at least about 200° C.

6. A linear polysiloxane formed by the cohydrolysis and condensation of (1) a material selected from the group consisting of dimethyldiethoxysilane, diphenyl diethoxysilane, methylphenyl diethoxysilane, diphenylsilanediol, silicone oils having hydroxy end groups, and mixtures thereof, with (2) a compound of claim 1 in which $R^1$ is a $(C_1-C_8)$-alkoxy group and at least one of $R^2$ and $R^3$ is a $(C_1-C_8)$-alkoxy group in concentrations of the latter compound (2) of 0.1 to 50 mole percent.

7. A linear polysiloxane formed by the cohydrolysis and condensation of (1) a material selected from the group consisting of dimethyldiethoxysilane, diphenyl diethoxysilane, methylphenyl diethoxysilane, diphenylsilanediol, silicone oils having hydroxy end groups, and mixtures thereof, with (2) a compound of claim 1 in which $R^1$ is a $(C_1-C_8)$-alkoxy group and at least one of $R^2$ and $R^3$ is a $(C_1-C_8)$-alkoxy group in concentrations of the latter compound (2) of 0.1 to 50 mole percent, and with (3) trimethylethoxysilane, a monofunctional silane for chain termination, in a concentration of 1 to 5 mole percent.

8. A cross-linked condensation product of the polysiloxane of claim 6 having linear siloxane chains thereof connected to other such chains through linkages resulting from the opening of disilacyclobutane groups, said linkages having the formula

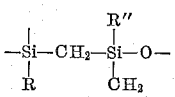

wherein
R and R'' are selected from the group consisting of phenyl and $(C_1-C_4)$-alkyl groups, said condensation product being obtained by heating a polysiloxane of claim 6 at a temperature of at least about 200° C.

9. A cross-linked condensation product of the polysiloxane of claim 6 having linear siloxane chains thereof connected to other such chains through a $-Si-O-Si-$ linkage derived from the hydrolytic cleavage and condensation of disilacyclobutane groups as a result of treatment with a member selected from the group consisting of strong inorganic acids and bases.

10. A method comprising the step of mixing in a solvent selected from the group consisting of ether and tetrahydrofuran, containing a small amount of an alkyl halide, a small amount of magnesium with a compound of the formula $$XCH_2Si(R°)_3 \qquad (III)$$

wherein
X is a halogen atom, and
R° is selected from the group consisting of halogen, $(C_1-C_4)$-alkyl, phenyl, $(C_1-C_8)$-alkoxy, and at least one of the R° groups being selected from the group consisting of halogen and $(C_1-C_8)$-alkoxy groups, the amount of alkyl halide being sufficient to start the reaction, then adding a large quantity of the compound of Formula III and then gradually adding magnesium to the resulting mixture while maintaining the temperature at 30° to 50° C., and maintaining the compound of Formula III in dominant proportion relative to magnesium throughout the major part of the reaction, the total amount of magnesium being from 1 to 2 equivalents per mole of the compound of Formula III, and then distilling a compound selected from the group of compounds defined in claims 1 and 2 under low pressure of 100 mm. Hg to 0.05 mm. Hg.

References Cited by the Examiner
UNITED STATES PATENTS 2,888,475  5/59  Pleuddemann _____ 260—448.2
3,046,291  7/62  Sommer _____ 260—46.5

OTHER REFERENCES

Eaborn: Organosilicon Compounds, Academic Press, page 370.

WILLIAM H. SHORT, *Primary Examiner.*

J. R. LEBERMAN, *Examiner.*